United States Patent
Kuo et al.

(10) Patent No.: US 8,568,147 B2
(45) Date of Patent: Oct. 29, 2013

(54) TISSUE MIMICKING PHANTOM

(75) Inventors: Tsung-Ter Kuo, Taichung County (TW); Shih-Huang Huang, Kaohsiung (TW)

(73) Assignee: Industrial Technology Research Institute, Hsin-Chu (TW)

( * ) Notice: Subject to any disclaimer, the term of this patent is extended or adjusted under 35 U.S.C. 154(b) by 1378 days.

(21) Appl. No.: 12/046,891

(22) Filed: Mar. 12, 2008

(65) Prior Publication Data
US 2009/0098521 A1 Apr. 16, 2009

(30) Foreign Application Priority Data
Oct. 16, 2007 (TW) ................................ 96138608 A

(51) Int. Cl.
G09B 23/00 (2006.01)

(52) U.S. Cl.
USPC ............ 434/272; 434/262; 434/267; 434/268

(58) Field of Classification Search
USPC .................................................. 434/262, 267
See application file for complete search history.

(56) References Cited

U.S. PATENT DOCUMENTS

| | | | |
|---|---|---|---|
| 2,995,832 A | 8/1961 | Alderson | |
| 3,852,893 A | 12/1974 | Smrcka | |
| 5,379,235 A | 1/1995 | Fisher et al. | |
| 5,803,746 A * | 9/1998 | Barrie et al. ................... | 434/267 |
| 5,906,940 A | 5/1999 | Wandrey et al. | |
| 6,122,536 A | 9/2000 | Sun et al. | |
| 6,485,690 B1 * | 11/2002 | Pfost et al. .................... | 422/552 |
| 6,931,951 B2 | 8/2005 | Wright et al. | |
| 7,272,766 B2 * | 9/2007 | Sakezles ........................ | 714/742 |
| 7,427,199 B2 * | 9/2008 | Sakezles ........................ | 434/267 |
| 7,677,897 B2 * | 3/2010 | Sakezles ........................ | 434/267 |
| 7,699,615 B2 * | 4/2010 | Sakezles ........................ | 434/274 |
| 7,993,140 B2 * | 8/2011 | Sakezles ........................ | 434/267 |
| 8,137,110 B2 * | 3/2012 | Sakezles ........................ | 434/267 |
| 8,425,234 B2 * | 4/2013 | Sakezles ........................ | 434/274 |
| 2003/0108587 A1 | 6/2003 | Orgill et al. | |
| 2006/0184005 A1 * | 8/2006 | Sakezles ........................ | 600/416 |
| 2006/0253761 A1 * | 11/2006 | Sakezles ........................ | 714/742 |
| 2007/0020598 A1 * | 1/2007 | Yamashita et al. ............ | 434/267 |
| 2007/0166670 A1 * | 7/2007 | Sakezles ........................ | 434/86 |
| 2008/0187895 A1 * | 8/2008 | Sakezles ........................ | 434/268 |
| 2009/0075244 A1 * | 3/2009 | Sakezles ........................ | 434/267 |
| 2010/0136510 A1 * | 6/2010 | Sakezles ........................ | 434/274 |
| 2011/0207104 A1 * | 8/2011 | Trotta et al. ................... | 434/267 |

* cited by examiner

Primary Examiner — Nikolai A Gishnock
(74) Attorney, Agent, or Firm — WPAT, PC; Justin King

(57) ABSTRACT

A tissue mimicking phantom is disclosed, in which the tissue-mimicking phantom comprises: at least an upper gelatin layer, each configured with at least a sunken area; at least a lower gelatin layer, each disposed beneath the at least one upper gelatin layer while being configured with at least a microchannel network having blood-mimicking fluid flowing therein; and at least a micro-heater. By the use of the sunken area of the at least one upper gelatin layer to simulate shapes and depths of different trauma wounds, the healing of anyone of the trauma wounds can be accessed clinically through a physical properties test while subjecting the trauma wound under different negative pressures and different dressings.

18 Claims, 5 Drawing Sheets

TISSUE MIMICKING PHANTOM

FIELD OF THE INVENTION

The present invention relates to a tissue mimicking phantom, and more particularly, to a phantom configured with a microchannel network having blood-mimicking fluid flowing therein that is capable of mimicking shapes, depths and temperature of different trauma wounds on human skin and thus functioning as a platform for testing therapeutic apparatuses.

BACKGROUND OF THE INVENTION

For most medical researches, animal experiments using rats or rabbits for in vivo bioassays are usually inevitable. However, as the muscle tissues of those experimental animals and those of human are after all not quite the same, it is noted that conventional animal experiments may not be able to generate accurate assessments relating to the actual condition of trauma wounds on human tissue. In addition, since the health conditions of different testing animals may be different that it is almost impossible to manually create trauma wounds of exactly the same shape and depth on those animal so as to prepare they for in vivo test, even when subjecting those testing animals under exactly the same environment, the healing of trauma wounds on different testing animals may not be the same. Therefore, it is common to waste a lot of time trying to conclude optimum healing parameters from in vivo test and thus design a therapeutic apparatuses for healing trauma wounds.

Over the past several years, vacuum-assisted closure (V.A.C.) therapy has been popularized and used as an adjunctive treatment in the management of many trauma wounds, which can help heal certain non-healing wounds by removing fluids and infectious material from the site and is applied to a special foam dressing packed in the wound cavity or over a flap or graft. In such V.A.C. system, special foam dressing with an attached evacuation tube is inserted into the wound and covered with an adhesive drape in order to create an airtight seal. Negative pressure is then applied by the use of a vacuuming pump and the wound effluent is collected in a canister. Although the exact mechanism has not been elucidated, it is evident that negative pressure contributes to wound healing by removing excess interstitial fluid, increasing the vascularity of the wound, and/or creating beneficial mechanical forces that draw the edges of the wound closer together. However, most current V.A.C. studies focus their researches upon the improvement of either the V.A.C. therapeutic apparatus itself or foam dressing packed in the wound cavity, and there is no available testing platform for clinically accessing the performance and physical properties of such V.A.C. therapeutic apparatus or foam dressing with respect to trauma wounds of different shapes and depths and under different negative pressures and different dressing. Thus, currently, there is no way of knowing how well the performance and physical properties a newly developed V.A.C. therapeutic apparatus are until it is actually being applied clinically to a test animal or human volunteer. In consequence, when it comes to the development of V.A.C. therapeutic apparatus or relating foam dressing, many efforts can be wasted in the process.

SUMMARY OF THE INVENTION

The object of the present invention is to provide a tissue mimicking phantom configured with a microchannel network having blood-mimicking fluid flowing therein that is capable of mimicking shapes, depths and temperature of different trauma wounds on human skin.

To achieve the above object, the present invention provides a tissue mimicking phantom for simulating human skin layer, comprising: at least an upper gelatin layer, each configured with at least a sunken area for simulating a trauma wound; and at least a low gelatin layer, each disposed beneath the at least one upper gelatin layer while being configured with at least a microchannel network having a blood-mimicking fluid flowing therein; and at least a micro-heater, for controlling temperature of the simulated trauma wound so as to mimic an inflammation condition of the trauma wound as it is contaminated.

In an exemplary embodiment of the invention, the tissue mimicking phantom further comprises: a temperature sensor, for measuring temperature variation inside the tissue mimicking phantom; a pressure sensor, for measuring a negative pressure applying on the tissue mimicking phantom; and a flow sensor, for measuring a flow velocity of the blood-mimicking fluid flowing in the microchannel network.

In another exemplary embodiment of the invention, the tissue mimicking phantom further comprises: an imaging device, being a device selected from the group consisting of a CCD (charged coupled device) imaging device and a CMOS (complementary metal-oxide semiconductor) imaging device and capable of monitoring in real time the proceeding of a performance test using the aforesaid tissue mimicking phantom and thus capturing, processing and outputting images correspondingly.

Moreover, by integrating the tissue mimicking phantom with a negative pressure therapeutic apparatus and enabling the tissue mimicking phantom to simulate a trauma wound thereon, the performance of the negative pressure therapeutic apparatus can be accessed and the same time that the negative pressure and the temperature of the simulated trauma wound can be measured and also the velocity variations of the blood-mimicking fluid flowing in the microchannel network can be measured. In addition, the temperature variations inside the microchannel network simulated an inflammation condition of the trauma wound being contaminated by bacteria can be generated by the used of the micro-heater.

Furthermore, fibroblast cells and granulation tissues can be implanted and cultivated inside the sunken area of the tissue mimicking phantom while monitoring the growth of the two in real time, by which the healing of the trauma wound under the operation of the negative pressure therapeutic apparatus can be accessed.

Therefore, by the use of the tissue mimicking phantom to simulated trauma wounds of different shapes and depths, the performance and physical properties of a negative pressure therapeutic apparatus can be obtained with respect to various healing conditions of different negative pressures and different dressings.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
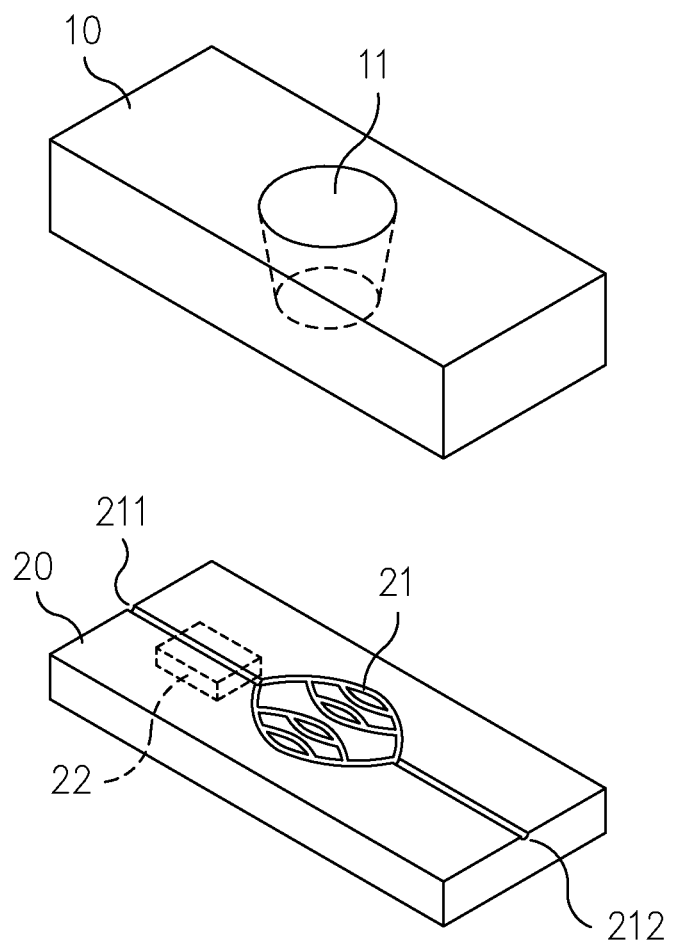
FIG. 1 is an exploded view of a tissue mimicking phantom according to an exemplary embodiment of the invention.
Figure 2:
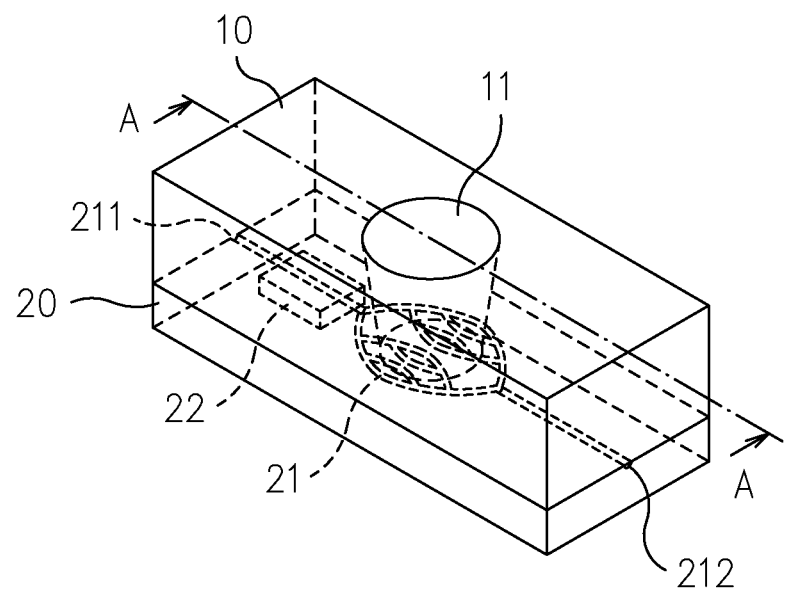
FIG. 2 is a three dimensional diagram showing the tissue mimicking phantom of FIG. 1.
Figure 3:
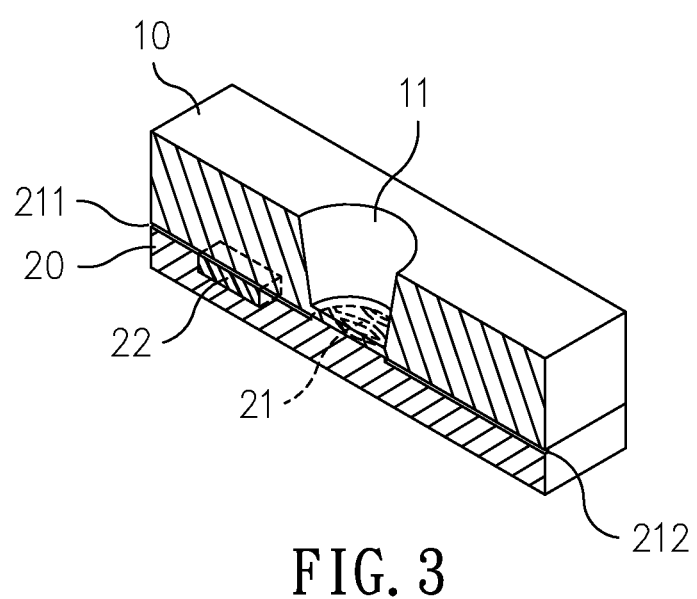
FIG. 3 is an A-A sectional view of FIG. 2.

Please refer to FIG. 1 to FIG. 3, which show a tissue mimicking phantom according to an exemplary embodiment of the invention. The tissue mimicking phantom of this embodiment is primarily comprises of an upper gelatin layer 10 and a lower gelatin layer 20, in which the upper gelatin layer 10 is configured with a sunken area 11, being shaped like a cup tapering from mouth to bottom, as shown in FIG. 3; and the lower gelatin layer 20 is disposed beneath the upper gelatin layer 10 while being configured with a microchannel network 21 having a blood-mimicking fluid flowing therein. The microchannel network 21 has an inlet 211 and an outlet 212, by which the blood-mimicking fluid can be fed into the microchannel network 21 from the inlet 211 and flow out of the same through the outlet 212. Moreover, the tissue mimicking phantom can further comprise a micro-heater 22, which can be embedded inside the lower gelatin layer 20 at any position thereof. In this embodiment, the micro-heater 22 is placed at a location right under the path of the microchannel network 21, so that the micro-heater 22 can heat up the lower gelatin layer 20 and thus bring along the temperature of the upper gelatin layer 10 to raise so as to enable the tissue mimicking phantom to feel like human skin and further to mimic an inflammation condition of a trauma wound as it is contaminated. It is noted that the microchannel network 21 can be distributed in any portion of the lower gelatin layer 20. However, it is preferred to be distributed at the portion corresponding to the sunken area 11 of the upper gelatin layer 10 and, as for other portion of the lower gelatin layer 20, it can also be distributed if required.

The upper and the lower gelatin layers 10, 20 are made of an organic polymer selected from the group consisting of gelatin, algin, polydimethylsiloxane (PDMS), and polymethyl methacrylate (PMMA); and are manufactured by a means of cast molding. Thereafter, the up and the lower gelatin layers 10, 20 are integrated into a piece by thermal decomposition. Gelatin is a kind of hydrophile protein that is produced from animals connective tissues, such as skin, bone, ligament and tendon; algin is a kind of water-solvable, high viscous gel, such as alginate (including sodium salt, potassium salt, ammonia-calcium salt, and sodium-calcium salt) and polypropylene glycol; and it is noted that PDMS and PMMA are organic polymers.

Due to its unique functionality, gelatin is used in a wide array of applications, most typically in edible/foods, e.g. gummy bears, jelly, and aspic; pharmaceutical, e.g. capsule and sugar-coated pill; and biomedical applications, e.g. artificial skin and tissue phantom. It is noted that gelatin can form thermally reversible gel with water, that is, it can melt while its temperature reaches 40° C. and is re-solidified as soon as it is cooled to about 30° C.; and the strength of such thermally reversible gel made of gelatin can be adjust by adjusting its concentration. Therefore, gelatin can be used for forming gelatin layers of various thicknesses and elasticity, respectively mimicking the epidermis, dermis layers of human skin. Furthermore, as shown in FIG. 1, the micro-heater 22 is integrally formed with the formation of the lower gelatin layer 20.

Figure 4:
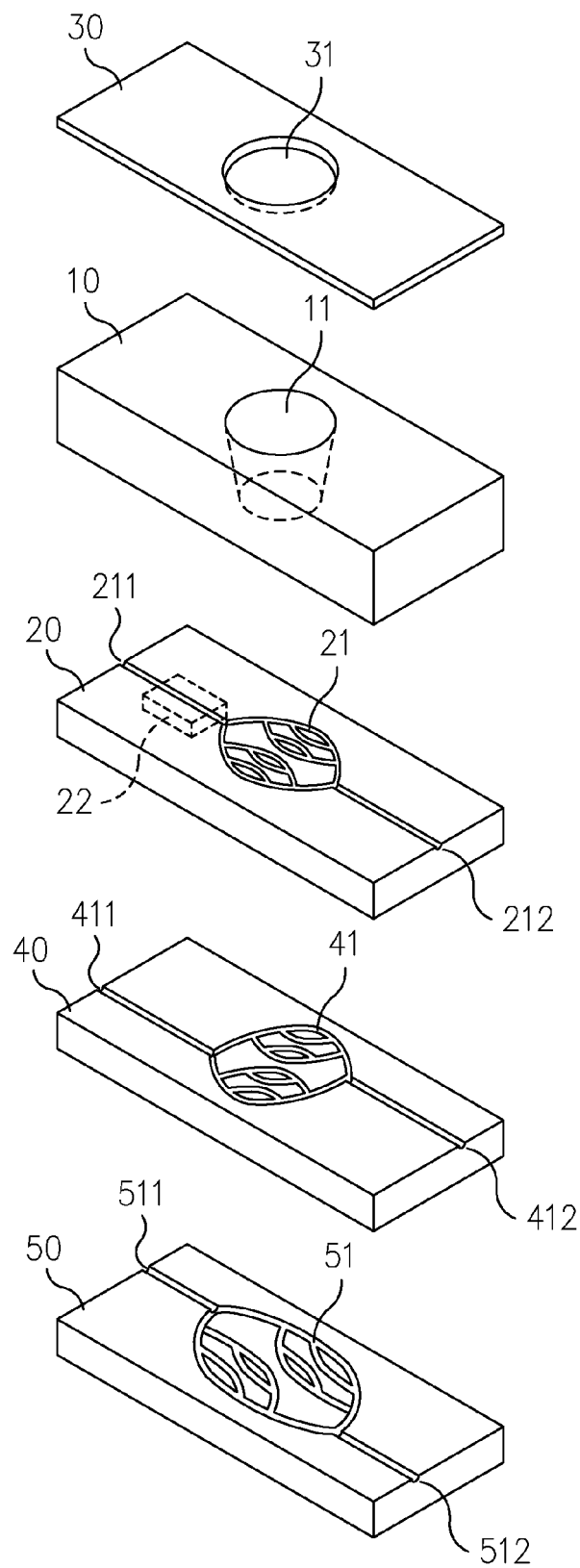
FIG. 4 is an exploded view of a tissue mimicking phantom according to another exemplary embodiment of the invention.

However, human skin is actually the formation of a plurality of gelatin-like layers of different thickness. Please refer to FIG. 4, which is an exploded view of a tissue mimicking phantom according to another exemplary embodiment of the invention. The tissue mimicking phantom of FIG. 4 is structured based upon the one shown in FIG. 1, which is composed of, sequentially from to top to bottom, a top skin layer 30, an upper gelatin layer 10, and three lower gelatin layers 20, 40, 50. Similarly, they all can be made of an organic polymer selected from the group consisting of gelatin, algin, polydimethylsiloxane (PDMS), and polymethyl methacrylate (PMMA); and are manufactured by a means of cast molding. The upper and the one lower gelatin layers 10, 20 are structured the same as those shown in FIG. 1, and thus are not described further herein.

The top skin layer 30 is disposed over the upper gelatin layer 10 and is configured with a hollow area 31. The hollow area 31 can be formed in any shape and any size, but should be positioned at a location corresponding to the sunken area 11 of the upper gelatin layer 10 while enabling it shape and size to pair with those of the sunken area 11. For instance, as the sunken area 11 of the upper gelatin layer 10 is shaped like a cup, the hollow area 31 of the top skin layer 30 should be shaped like a circular hole. In addition, there can be more than one sunken area 11 to be formed on the upper gelatin layer 10, and they can be formed with different sizes, shapes and depths.

The lower gelatin layers 20, 40 50 mimic the multi-layered dermis structure of human skin, which are configured with microchannel networks 21, 41, 51, in respective, to be used for mimicking micro-vascular architecture of human skin. Similarly, the microchannel networks 21, 41, 51 are all designed with inlets 211, 411, 511 and outlets 212, 412, 512 in respective, so that the blood-mimicking fluid can be fed into the microchannel networks 21, 41, 51 from the inlets 211, 411, 511 and flow out of the same through the outlets 212, 412, 512. For enhancing the truthfulness of the mimicking, the hardness of the plural lower gelatin layers 20, 40, 50 should be different from each other in a manner that the closer the lower gelatin layer is arranged to the upper gelatin layer 10, the smaller the hardness will be. For example, as the gelatin layers of the tissue mimicking phantom are the mixtures of water and gelatin at different ratios, the top skin layer 30 is a gelatin-water mixture at 1:1 ratio; the upper gelatin layer 10 is at 1:5; and the softer structure, such as those lower gelatin layers 20, 40, 50 are at 1:10, 1:15, and 1:20 in respective. Moreover, for mimicking actual micro-vascular architecture of human skin, the diameters of microchannel networks 21, 41, 51 should be different from each other and are configured in a manner that the closer the lower gelatin layer is arranged to the upper gelatin layer, the smaller the diameter of its microchannel network will be. That is, the microchannel network 21 if the lower gelatin layer 20 is the thinnest while that of the lower gelatin layer 50 is the thicknest. As for the micro-heater 22, it is still being embedded inside the lower gelatin layer 20. However, it can instead be embedded inside either the lower gelatin layer 40 or the lower gelatin layer 50, or all of the three lower gelatin layers 20, 40, 50 can be embedded with a micro-heater 22 since there can be more than one micro-heater 22 in the tissue mimicking phantom.

Figure 5:
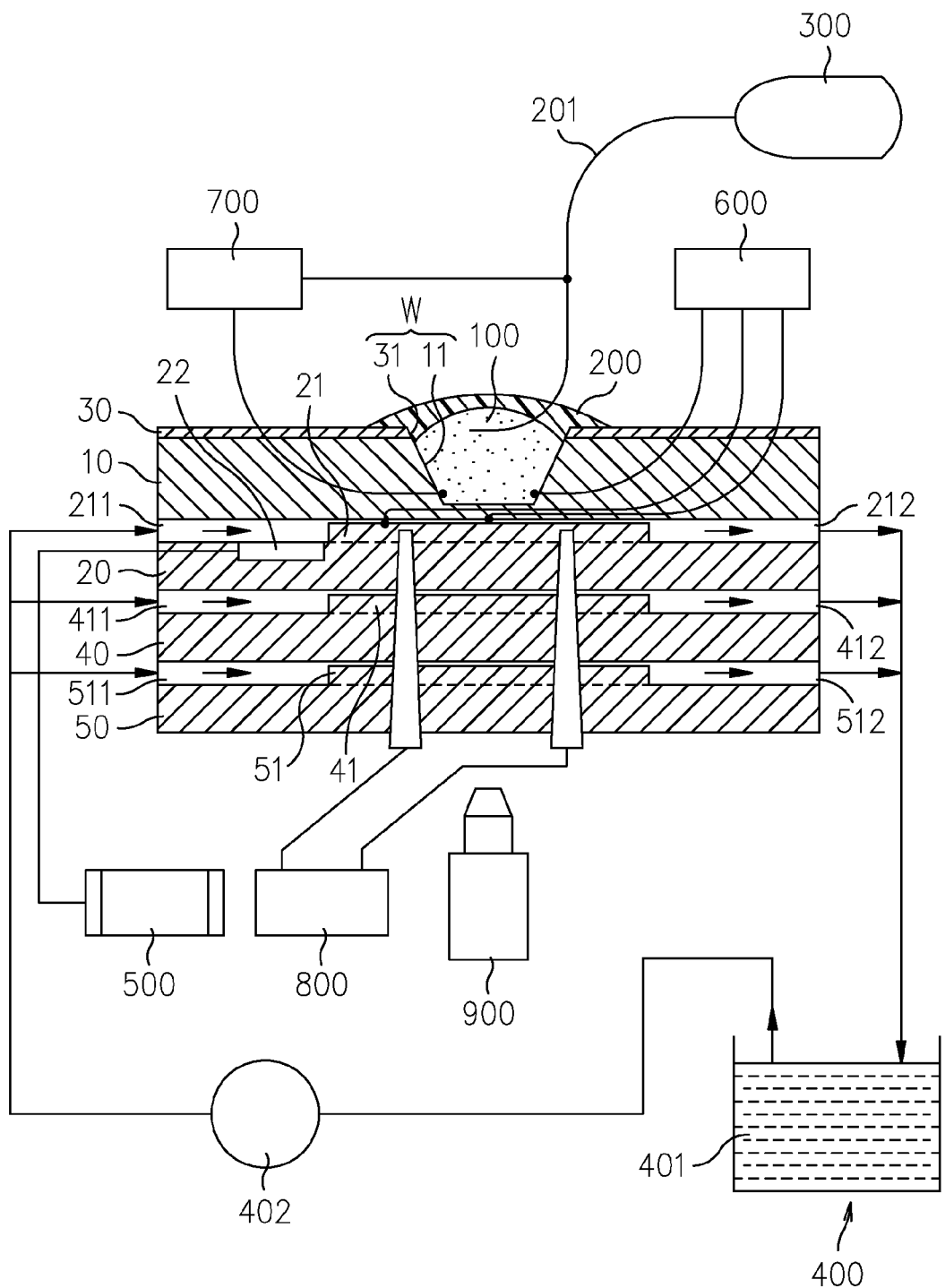
FIG. 5 is a cross sectional diagram showing the tissue mimicking phantom of FIG. 4 integrated and used in a negative pressure therapeutic system for accessing the performance of the tissue mimicking phantom.

Please refer to FIG. 5, which is a cross sectional diagram showing the tissue mimicking phantom of FIG. 4 integrated and used in a negative pressure therapeutic system for accessing the performance of the tissue mimicking phantom. As shown in FIG. 5, the top skin layer 30, the upper gelatin layer 10 and the three lower gelatin layers 20, 40, 50 are integrated into a whole by thermal decomposition while enabling the sunken area 11 and the hollow area 30 to form a craft simulating a trauma wound W.

First, a foam dressing, being cut into a size matching to the sizes and shapes of the sunken area 11 and the hollow area 31, is packed into the trauma wound W, and then, the trauma wound W is sealed by a patch 200 which is connected to a sucking disc (not shown in the figure). Moreover, the sucking disc is connected to a vacuum pump 300. The vacuum pump 300 can be activated in a continuing mode or an intermittent mode so as to provide a negative pressure to the trauma wound W.

The inlets 211, 411, 511 and outlets 212, 412, 512 of the microchannel networks 21, 41, 51 are connected to a reservoir 400 storing a blood-mimicking fluid 401. In this embodiment, the blood-mimicking fluid 401 is composed of 1.82% nylon pellet, 83.9% water, 10% glycerine, 3.4% dextran, 1% surfactant. However, it can be composed otherwise and is not limited thereby. The blood-mimicking fluid is heated by a heater to about 37° C., and the it is pump by a circulating pump 402 to flow into the microchannel networks 21, 41, 51 through the inlets 211, 411, 511, and then out of the same from the outlets 212, 412, 512 and back into the reservoir 400 to complete a circulation.

Moreover, the micro-heater 22 embedded in the lower gelatin layer 20 is connected to a temperature controller 50, by which the heating of the micro-heater 22 can be controlled and adjusted. In addition, there can be a temperature sensor 600, a pressure sensor 700 and flow sensor 800 to be arranged at different locations in the system shown in FIG. 5, which are use for measuring the negative pressure and temperature of the trauma wound W, as well as a flow velocity of the blood-mimicking fluid 401 flowing in the microchannel networks 21, 41, 51 simultaneously. It is noted that the micro-heater 22 and the temperature sensor 600 can be integrated in a single chip by the use MEMS technique. By the feedback of the micro-heater 22, the temperature controller 500 and the temperature sensor 600, temperature of the trauma wound W can be accurately controlled. Moreover, the system of the tissue mimicking phantom further comprises: an imaging device, being a device selected from the group consisting of a CCD (charged coupled device) imaging device and a CMOS (complementary metal-oxide semiconductor) imaging device and capable of monitoring in real time the proceeding of a performance test using the aforesaid tissue mimicking phantom and thus capturing, processing and outputting images correspondingly.

Thus, by the aforesaid system of the tissue mimicking phantom, one can achieve the objects listed as following:

(1) The characteristics, such as the porosity, of the dressing can be changed at will so as to measure the actual negative pressure felt in the trauma wound W and compare the same with the negative pressure provided by the vacuum pump 300, and to measure the temperature variations in the trauma wound W as well as the flow and temperature variations in microchannel networks of different gelatin layers while subjecting the trauma wound W under the same negative pressure.

(2) The operation mode of the system can be changed at will between the continuous mode and the intermittent mode at will, so as to measure the temperature variations in the trauma wound W as well as the flow and temperature variations in microchannel networks of different gelatin layers while subjecting the trauma wound W under the same negative pressure.

(3) The shape and depth of the trauma wound W can be changed at will, so as to measure the temperature variations in the trauma wound W as well as the flow and temperature variations in microchannel networks of different gelatin layers while subjecting the trauma wound W under the same negative pressure.

(4) The dressing and the negative pressure provided can be changed at will, and moreover, fibroblast cells and granulation tissues can be implanted and cultivated inside the trauma wound W of the tissue mimicking phantom while monitoring the growth of the two in real time, by which the healing of the trauma wound W under the operation of the negative pressure therapeutic apparatus can be accessed.

It is emphasized that the negative pressure therapeutic system shown in FIG. 5 is only an exemplary embodiment of the invention, that the application of the tissue mimicking phantom is not limited thereby and thus can be used in other biomedical applications. Please refer to FIG. 6, which is a cross sectional diagram showing the tissue mimicking phantom of FIG. 1 integrated and used in a negative pressure therapeutic system for accessing he performance of the tissue mimicking phantom according to the cultivation of fibroblast cells and granulation tissues implanted inside the simulated trauma wound of the tissue mimicking phantom.

Similarly, the upper gelatin layer 10a and the lower gelatin layers 20a are integrated into a whole by thermal decomposition while enabling the sunken area 11 and the hollow area 30 to form a craft simulating a trauma wound; and then a foam dressing, being cut into a size matching to the sizes and shapes of the sunken area 11 and the hollow area 31, is packed into the trauma wound; thereafter, the trauma wound is sealed by a patch 200 which is connected to a sucking disc (not shown in the figure). Moreover, the sucking disc is connected to a vacuum pump 300 by a duct 201. The inlet 211 and outlet 212 of the microchannel networks 21 are connected to a reservoir 400 storing a blood-mimicking fluid 401. In this embodiment, there is no micro-heater to be embedded inside the lower gelatin layer 20a. However, in other embodiments, there can be one or more than one micro-heaters to be fitted inside the lower gelatin layer 20a as required by actual need. Similarly, there are also temperature sensor 600, pressure sensor 700 and imaging device 900 in the system. It is noted that the aforesaid components of the negative pressure therapeutic system is functioning the same as those described in the system shown in FIG. 5, and thus are not described further herein.

Figure 6:
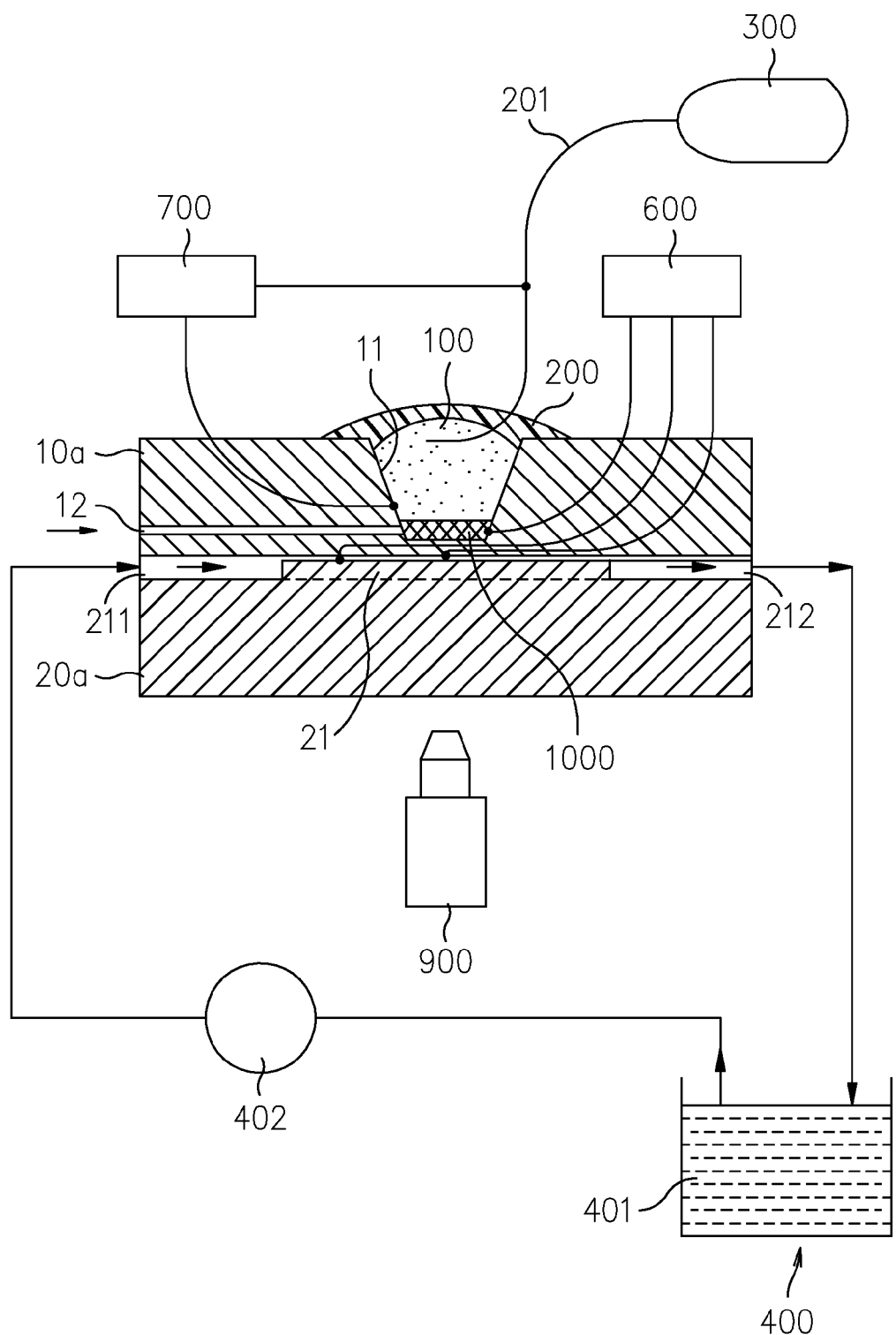
FIG. 6 is a cross sectional diagram showing the tissue mimicking phantom of FIG. 1 integrated and used in a negative pressure therapeutic system for accessing he performance of the tissue mimicking phantom according to the cultivation of fibroblast cells and granulation tissues implanted inside the simulated trauma wound of the tissue mimicking phantom.

The characteristic of the negative pressure therapeutic system shown in FIG. 6 is that: as there are fibroblast cells and granulation tissues 1000 implanted and cultivated inside the sunken area 11 of the upper gelatin layer 10a, while such fibroblast cells and granulation tissues 1000 are covered by a foam dressing 100, the upper gelatin later 10a is configured with a tube 12 boring through the upper gelatin layer 10a and channeling with the sunken area 11 so as to be used for feeding a culture medium, oxygen and carbon dioxide therethrough from the outside of the tissue mimicking phantom into the sunken area 11 and reach the fibroblast cells and granulation tissues 1000 for assisting the two to growth. Thereby, by observing the growth of the fibroblast cells and granulation tissues 1000 in real time, the healing of the trauma wound under the operation of the negative pressure therapeutic apparatus can be accessed.

To sum up, by the use of the tissue mimicking phantom to simulated trauma wounds of different shapes and depths, the performance and physical properties of a negative pressure therapeutic apparatus can be obtained with respect to various healing conditions of different negative pressures and different dressings. Furthermore, fibroblast cells and granulation tissues can be implanted and cultivated inside the sunken area of the tissue mimicking phantom while monitoring the growth of the two in real time, by which the healing of the trauma wound under the operation of the negative pressure therapeutic apparatus can be accessed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tissue mimicking phantom, comprising:
    at least an upper gelatin layer, each configured with at least a sunken area, wherein each sunken area is a round void of gelatin positioned exclusively in the upper gelatin layer;
    at least a lower gelatin layer, each disposed beneath the at least one upper gelatin layer while being configured with at least a microchannel network having a blood-mimicking fluid flowing therein, wherein each lower gelatin layer has a distinct microchannel network, and each distinct microchannel network has differing microchannel diameters proportional to the distance of the corresponding lower gelatin layer from the closest upper gelatin layer; and
    at least a micro-heater.

2. The tissue mimicking phantom of claim 1, wherein each sunken area is shaped like a cup tapering from mouth to bottom.

3. The tissue mimicking phantom of claim 1, wherein the upper gelatin layer is configured with a plurality of sunken areas and the plural sunken areas are different in shape, size and depth.

4. The tissue mimicking phantom of claim 1, wherein the microchannel network is connected with a reservoir storing the blood-mimicking fluid for enabling the blood-mimicking fluid to be fed into the microchannel network.

5. The tissue mimicking phantom of claim 4, wherein the microchannel network is further comprises:
    at least an inlet, provided for the blood-mimicking fluid to flow into the microchannel network therefrom; and
    at least an outlet, provided for the blood-mimicking fluid to flow out the microchannel network therefrom.

6. The tissue mimicking phantom of claim 1, wherein the upper gelatin layer further comprises a top skin layer, arranged at the top portion of the upper gelatin layer while being configured with a hollow area.

7. The tissue mimicking phantom of claim 1, wherein when there are a plurality of the lower gelatin layers configured in the tissue mimicking phantom, the micro-heater is embedded inside one lower gelatin layer selected from the plural lower gelatin layers.

8. The tissue mimicking phantom of claim 7, wherein there are a plurality of such microchannel networks configured respectively in each of the plural lower gelatin layers in a manner that the closer the lower gelatin layer is arranged to the upper gelatin layer, the smaller the diameter of its microchannel network will be.

9. The tissue mimicking phantom of claim 1, wherein the hardness of the plural lower gelatin layers are different from each other in a manner that the closer the lower gelatin layer is arranged to the upper gelatin layer, the smaller the hardness will be.

10. The tissue mimicking phantom of claim 1, wherein the microchannel network configured in the lower gelatin layer is positioned at a location corresponding to the sunken area of the upper gelatin layer.

11. The tissue mimicking phantom of claim 1, wherein the upper and the lower gelatin layers are made of an organic polymer selected from the group consisting of gelatin, algin, polydimethylsiloxane (PDMS), and polymethyl methacrylate (PMMA).

12. The tissue mimicking phantom of claim 11, wherein both of the upper and the lower gelatin layer are formed by cast molding.

13. The tissue mimicking phantom of claim 11, wherein the micro-heater is integrally formed with the formation of the lower gelatin layer.

14. The tissue mimicking phantom of claim 1, wherein the micro-heater is a chip having a temperature sensor integrated therein.

15. The tissue mimicking phantom of claim 1, wherein the upper gelatin later is configured with a tube boring through the upper gelatin layer and channeling with the sunken area so as to be used for feeding a culture medium, oxygen and carbon dioxide therethrough from the outside of the tissue mimicking phantom into the sunken area.

16. The tissue mimicking phantom of claim 1, further comprising:
    a temperature sensor, for measuring temperature variation inside the tissue mimicking phantom;
    a pressure sensor, for measuring a negative pressure applying on the tissue mimicking phantom; and
    a flow sensor, for measuring a flow velocity of the blood-mimicking fluid flowing in the microchannel network.

17. The tissue mimicking phantom of claim 1, further comprising:
    an imaging device, for monitoring in real time the status of the tissue mimicking phantom as the tissue mimicking phantom is subjected to a performance test, and thus capturing, processing and outputting images accordingly.

18. The tissue mimicking phantom of claim 17, wherein the imaging device is a device selected from the group consisting of a CCD (charged coupled device) imaging device and a CMOS (complementary metal-oxide semiconductor) imaging device.

* * * * *